Sept. 7, 1948.  W. R. OST  2,448,907
PIPE JOINT
Filed Jan. 25, 1944

INVENTOR
William R. Ost.
BY
HIS ATTORNEY

Patented Sept. 7, 1948

2,448,907

UNITED STATES PATENT OFFICE 2,448,907

PIPE JOINT

William R. Ost, Verona, N. J., assignor to Walworth Patents Inc., Boston, Mass., a corporation of Massachusetts Application January 25, 1944, Serial No. 519,618

2 Claims. (Cl. 285—115)

This invention relates to joints and fittings for tubular members and to the method of making the joints. More particularly, the invention resides in permanently connecting the adjacent ends of conduits of rectangular cross-section where a substantially continuous interior surface free from gaps, projections or other interruptions is required.

An object of this invention is to join the adjacent ends of tubular members so that a smooth continuous inner surface results.

Another object of the invention is to hermetically seal the joint between the ends of tubular members forming a continuous length of tubing.

Another object of the invention is to produce a length of tubing from permanently united sections having the characteristics of a unitary structure in performing its intended functions.

Another object of the invention is to utilize the joint element for the tubular members as a holding and aligning device for these members during the joint forming operation.

Another object of the invention is to effect permanent jointure between tubular members by simple and economical heating methods which assure production of satisfactory joints without application of skilled welding technique.

Another object of the invention is to secure flanges or other separable coupling elements permanently to tubular members so that no distortion occurs and accurate alignment with matching flanges is secured.

Other objects and advantages will become apparent from the following description taken in connection with the accompanying drawing wherein.

Figure 1:
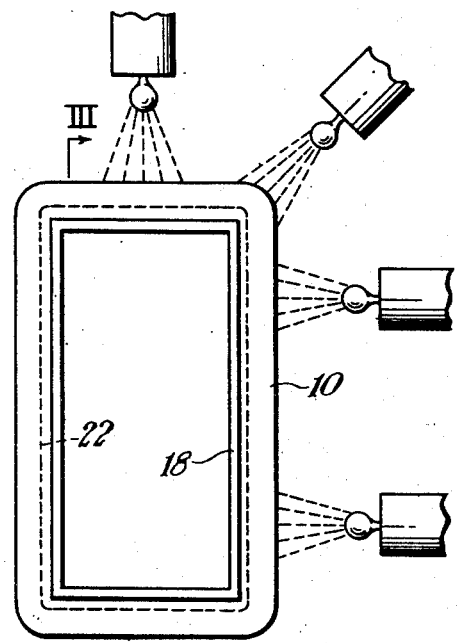
Fig. 1 is an end elevation of the joint showing a step in the method of heating.
Figure 3:
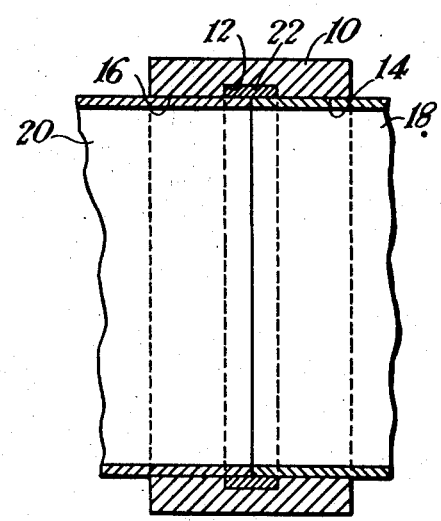
Fig. 3 is a section taken on the line III—III of Fig. 1.
Figure 2:
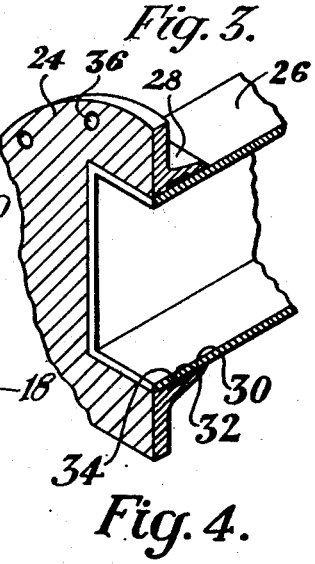
Fig. 2 is a perspective view of the joint shown in Fig. 1, further showing a step in the method of heating.

Referring more particularly to Figs. 1–3 of the drawing, a sleeve 10 of non-ferrous material, such as copper or copper alloy, rectangular in cross-section, is used as the fitting and is provided with an interior surface of uniform bore from end to end rectangular in cross-section and interrupted by a recesss 12 substantially equidistant from the ends. The recess 12, which is shallow and preferably of rectangular cross-section, extends substantially parallel with the ends of the sleeve around the interior surface thereof and defines connected sockets 14 and 16 therein for the reception of separate tubular members 18 and 20. The sleeve may be of any suitable length to accommodate the entered ends of the tubular members and has a substantially uniform wall thickness from two to three times that of the tubular members. The entered end faces of the tubular members 18 and 20 are positioned in abutting relation within the sleeve 10 with the recess 12 overlying or spanning the entered ends an approximately equal amount. The tubular members 18 and 20 are of similar rectangular cross-section as the sleeve 10 and are preferably a close sliding fit within the sockets 14 and 16 with the end faces thereof being smoothly finished and free from fins, burrs or other projections or gaps.

Within the recess 12 is an insert of brazing alloy 22 which may be formed from strips of wire presssed into the recess or secured therein by other means including insertion in the molten condition and afterwards set. Preferably, the brazing alloy 22 is a composition of silver, copper and phosphorus, cadmium or zinc or combinations thereof having a melting point of 1050° F. to 1300° F., which is below that of the material of the sleeve 10 and tubular members 18 and 20. The fit between the tubular members 18 and 20 and the sockets 14 and 16, respectively, may be obtained by swaging or other expanding operations conducted on the tubing ends or, if the tubular members are oversize, by filing or other metal removing process. However, the required fit should be obtained without forcibly driving the sleeve 10 on to the tubing end to avoid any distortion of the joint elements.

The inner surface of the sleeve 10 comprising the sockets 14 and 16 is preferably machined to close tolerances as by broaching. The opposed end faces of the tubular members 18 and 20 are also carefully finished to obtain a close fit therebetween when these ends are entered in their respective sockets. In this manner, the tubular members are in alignment and there is no projecting edge or step between the two tubular members at the joint faces. The sleeve 10 thus acts as a holding jig to secure the desired alignment as well as acting as a container for the brazing alloy.

After the tubing ends have been properly fitted to the sleeve 10, the outer surfaces of the tubing ends are thinly coated with a suitable flux. The flux is not permitted to enter within the tubing ends and any appearing therein is removed. The sockets 14 and 16 may also be fluxed prior to insertion of the tubing ends therein. With the assembled parts properly supported against relative movement an oxyacetylene torch flame is applied first to one corner and the two adjacent portions of the surfaces of one tubular member, such as the member 18. The heat so applied to the tubular member 18 adjacent the sleeve 10 is continued until the flux near the edge of the sleeve 10 begins to bubble. The flame is then directed to the opposite corner of the tubular member 18 and the two surface portions adjacent thereto until a similar condition of the flux is observed. The other two corners and adjacent surface portions are then similarly heated. The purpose of heating the tubular member 18 is to expand it tightly within the sleeve 10 which remains unheated by the flame during this operation. Distortion of the tubular member during expansion is avoided by the heating method described. It will be apparent that some of the heat applied to the tubular member is transferred to the inside of the sleeve 10 upon expansion of the tubular member 18 therein.

After the tubular member 18 has been expanded the heating of the sleeve 10 is commenced. The torch flame is first directed on to one corner of the sleeve 10 and the portions of the surface on each side of that corner. The flame is applied with a wiping motion from the middle of the sleeve 10 to the edge thereof and on to the tubular member. The corner portion so heated is thus stretched away from the surface of the tubular member 18. The torch flame is then removed in order to permit the heated sleeve portion to unstretch and squeeze out the molten brazing alloy 22 at the corner. Enough heat will have been conveyed into the sleeve 10 to bring it to brazing temperature and melt the brazing alloy 22 so that the alloy will flow out from the middle portion toward the sleeve edge.

The flame is then directed on to that corner of the sleeve 10 diagonally opposite the corner previously mentioned. This second corner and the portions of the sleeve adjacent thereto are likewise heated with a wiping motion of the torch from the middle of the sleeve towards the same edge as previously described. The torch is then removed to permit the unstretching operation and appearance of the brazing alloy. The other two corners of the sleeve are then sequentially heated and unstretched as previously described. Completion of the progressive brazing operation to permanently secure the tubular member 18 in the sleeve 10 is noted by the appearance of a slight fillet of brazing alloy extending completely around the edge of the sleeve adjoining the tubular member when the operation has been satisfactorily conducted. It will be apparent that on larger sizes of sleeves and tubular members the diagonal heating method may be dispensed with and each corner may be heated in sequence by proceeding either clockwise or counter-clockwise around the sleeve or tubular member.

It is an important feature of this invention that the heat is initially applied to the corners of both sleeve and tubular member as distinguished from the surfaces of these members located between the corners. Where the dimensions of the sleeve and tubular member are small in comparison with the area covered by the torch flame during the wiping action thereof, it will be unnecessary to separately heat the areas lying between the corners. However, on larger sizes of sleeves and tubular members it is probable that the intermediate portions of the members between the corners will remain below brazing temperature during the described brazing operation conducted on the corners. Consequently, it may be necessary to heat these intermediate portions subsequently to the heating of the corners in order to complete the expansion of the tubular member in the sleeve and also the brazing of the sleeve to the tubular member.

After one end of the sleeve has been completely brazed to the tubular member, a similar series of operations is carried out to secure the tubular member 20 in the socket end 16 of the sleeve 10. As the description of this brazing treatment would be repetitive of that previously given herein it is deemed unnecessary to include it in this description.

Upon completion of the brazing operation of both tubular members 18 and 20, the sleeve 10 is hermetically sealed to the entered ends thereof and a continuous length of tubing may be formed by a similar method applied to other sleeves and tubular members. The brazing alloy 22 penetrates between the abutting ends of the tubular members 18 and 20 during the brazing operation so that the interior surfaces of the tubular members are free from gaps, projections or other interruptions and a smooth interior wall results. In constructions used for conducting high frequency current in certain electrical apparatus, it is highly important that a substantially continuous interior surface be provided and, by use of the teaching of this invention, such products can be quickly and economically formed.

Figure 4:
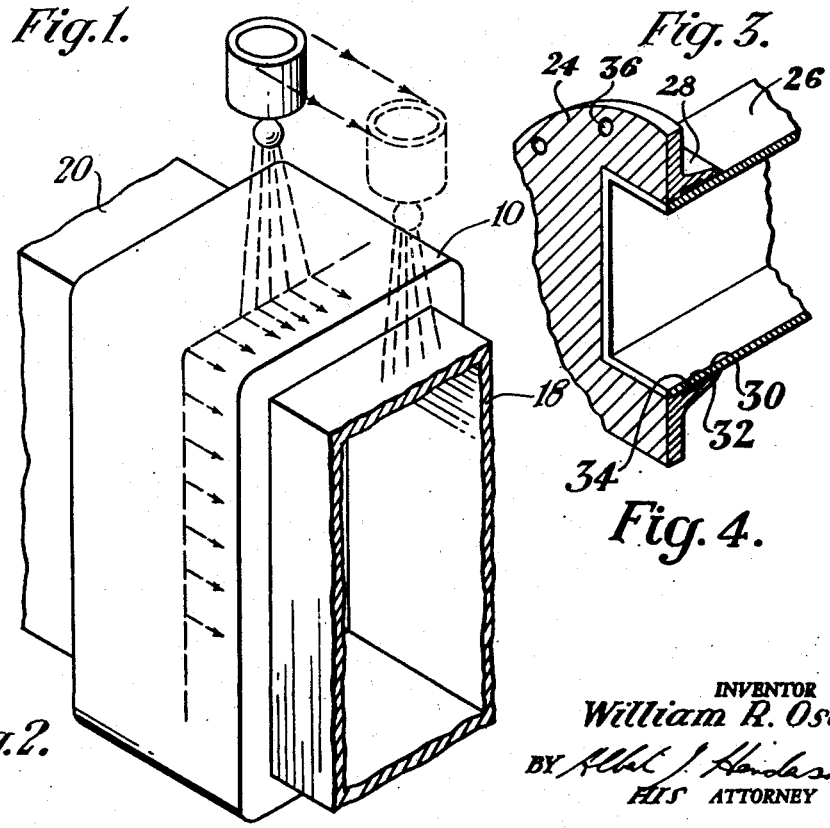
Fig. 4 is a partial perspective view of a modified form of joint.

In the embodiment of Fig. 4 a flange 24 is used as the fitting member and is secured to a tubular member 26 by a brazing operation substantially the same as that previously described in connection with the sleeve 10. The flange 24 which is of non-ferrous material, such as copper or copper alloy, is cylindrical in form and is provided with a reduced neck portion 28 preferably of rectangular cross-section projecting therefrom. The flange and neck portion have a uniform bore 30 of rectangular cross-section. A recess 32 is formed in the bore 30 substantially equidistant from the ends of the flange and neck portion and is preferably located within the boundary of the neck portion 28. The recess 32 is shallow and rectangular in cross-section, as in the previous embodiment, and contains a similar insert of brazing alloy 34 of silver, copper and phosphorus having a melting point of 1050° F. to 1300° F. It will be apparent that the flange 24 could also be rectangular in cross-section if desired or of any other conformation besides cylindrical. Also the neck portion could be cylindrical or otherwise formed as long as the bore is rectangular to receive the tubular member.

The flange connection permits the forming of separable joints between lengths of tubing which may or may not contain permanent joints formed by the sleeve 10. The usual bolt holes 36 may be provided in the flange 24 for connecting it to a similar flange when the length of tubing is made up. The tubular member 26 thus extends through the reduced neck portion 28 and terminates flush with the face of the flange 24 so that an uninterrupted length of tubing may be formed when a similar flange and tubing unit is connected thereto.

The rectangular bore 30 is preferably finished to the same close tolerances as were used in connection with the sleeve member 10 of the previously described embodiment. The flange parts are accurately finished so that when two flanges are bolted together a continuous, smooth inside surface is present throughout the length of tubular members thus connected. Moreover, after the flange is secured to the end of the tubular member 26 no distortion need occur due to the novel heating method now to be described.

The fluxing and brazing operations are conducted on the flange and tubing modification as in the previously described embodiment of the invention. The tubular member 26 is first expanded in the flange bore 30 by heat applied progressively to the four corners and, if necessary, thereafter to the surfaces between the corners. The torch flame is then transferred to one corner of the neck portion 28 adjacent the junction with the flange and wiped towards the edge of the neck portion which becomes stretched away from the tubular member 26 and then unstretched by removal of the source of heat. The diagonally opposite corner of the neck portion is then similarly treated as are the two remaining corners to complete the brazing operation. If the size of the flange 24 and tubular member 26 warrants such treatment, the intermediate portions of these members may be separately heated subsequent to the corner heating described. It will thus be apparent that no essential alteration in the brazing technique of this invention is required for the flange variation disclosed in Fig. 4.

Although a particular embodiment of the invention has been shown and described herein, it will be apparent that the invention is not limited thereto but is applicable to cylindrical sleeves, flanges and tubular members as well as to the rectangular form disclosed. The appended claims are intended to cover all modifications which do not depart from the spirit and scope of the invention described and shown herein.

I claim:

1. A joint for tubular members comprising a sleeve member within which adjacent ends of the tubular members are entered in abutting relation, said sleeve member having an internal recess which spans said abutting end faces, and a brazing alloy amalgamating said sleeve to the tubular members and connecting said abutting end faces to form a continuous conduit substantially uninterrupted on the interior surface, said alloy being initially contained in said recess.

2. A joint for tubular sections comprising an annular sleeve member of rectangular cross-section within which the adjacent ends of two such sections are entered in closely fitting relation with said sleeve, said sleeve having an interior surface of uniform bore from end to end intersected by a continuous recess, said recess being substantially equidistant from and parallel with said sleeve ends and spanning the abutting end faces of the entered sections, and a brazing alloy having a melting point between 1050° F. and 1300° F. extending along said interior surface coextensive with said sleeve and between said abutting end faces, said alloy amalgamating said sleeve to the sections and connecting said abutting end faces to form a continuous conduit substantially uninterrupted on the interior surface of the connected sections, said alloy being initially contained in strip form wholly within said recess.

WILLIAM R. OST.

REFERENCES CITED

The following references are of record in the file of this patent:

UNITED STATES PATENTS

| Number | Name | Date |
|---|---|---|
| 217,249 | Tasker | July 8, 1879 |
| 333,446 | Busha | Dec. 29, 1885 |
| 583,819 | Rome | June 1, 1897 |
| 654,131 | Burke | July 24, 1900 |
| 2,040,092 | Leedy | May 12, 1936 |
| 2,050,728 | Ost | Aug. 11, 1936 |
| 2,094,495 | Robinson | Sept. 28, 1937 |
| 2,144,332 | Glasser | Jan. 17, 1939 |